US008868488B2

(12) United States Patent
Shrufi

(10) Patent No.: US 8,868,488 B2
(45) Date of Patent: Oct. 21, 2014

(54) TECHNIQUES FOR INTEGRATING STRUCTURED ACCOUNTING DATA WITH UNSTRUCTURED DATA

(75) Inventor: Adel Shrufi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 12/394,054

(22) Filed: Feb. 27, 2009

(65) Prior Publication Data

US 2010/0223559 A1 Sep. 2, 2010

(51) Int. Cl.
*G06F 17/30* (2006.01)
*G06Q 10/10* (2012.01)
(52) U.S. Cl.
CPC ............ *G06Q 10/10* (2013.01); *G06F 17/3056* (2013.01); *G06F 17/30557* (2013.01)
USPC ....................................................... 707/608
(58) Field of Classification Search
USPC ....................................................... 707/608
See application file for complete search history.

(56) References Cited

U.S. PATENT DOCUMENTS

| | | | |
|---|---|---|---|
| 6,236,994 B1 | 5/2001 | Swartz et al. | |
| 2002/0161733 A1 * | 10/2002 | Grainger | 706/45 |
| 2004/0010433 A1 * | 1/2004 | Grettve et al. | 705/7 |
| 2004/0015408 A1 * | 1/2004 | Rauen et al. | 705/26 |
| 2005/0097440 A1 * | 5/2005 | Lusk et al. | 715/500.1 |
| 2005/0188016 A1 | 8/2005 | Vdaygiri et al. | |
| 2007/0156499 A1 * | 7/2007 | Berger et al. | 705/9 |
| 2007/0162467 A1 * | 7/2007 | Wolber et al. | 707/100 |
| 2008/0040173 A1 | 2/2008 | Aleong et al. | |
| 2008/0091448 A1 | 4/2008 | Niheu et al. | |
| 2008/0270463 A1 * | 10/2008 | Wang et al. | 707/103 R |
| 2009/0006948 A1 * | 1/2009 | Parker et al. | 715/255 |

OTHER PUBLICATIONS

Henry, How to Create Document Templates for Document Libraries, Feb. 12, 2007, pp. 1-12.*
Hlll, Electronic Data Interchange: A Definition and Perspective, 1989, pp. 1-12.*
"Enabling Technology for Your Expanding Workplace", retrieved at <<http://www.grace-hunt.com/OurPartners/Pages/Partners.aspx>>, Jan. 5, 2009, pp. 2.
"Crimsonwing Publishing—The only Microsoft Certified Industry solution for the Media & Entertainment Industry", retrieved at <<https://solutionfinderbeta.microsoft.com/SDK/Solutions/SolutionDetailsView.aspx?solutionid=7c5db5ed0c3842429ea2232e673ac85f&partnerid=1eff9974-40eb-42bd-9e2b-310d3f9192b8>>, Jan. 5, 2009, pp. 5.

(Continued)

*Primary Examiner* — Albert Phillips, III
(74) *Attorney, Agent, or Firm* — Damon Rieth; Jim Ross; Micky Minhas

(57) ABSTRACT

Various technologies and techniques are disclosed for integrating structured accounting data with unstructured data. From an application that manages structured accounting data related to an entity, a user selection is received to create a document container for a collaboration tool. The document container is used for storing unstructured data related to the entity. In response to the selection of the create option, a site creation service is launched for automatically creating the document container using settings previously specified by an administrator on a configuration screen of the application. Once the document container is created, unstructured data related to the entity is stored in the document container. The user can view and navigate between the structured accounting data and unstructured data without having to leave the application. Unstructured data is automatically published to the document container for the entity as users interact with the application.

20 Claims, 8 Drawing Sheets

(56) References Cited

OTHER PUBLICATIONS

"InScope Solutions: Project-Accounting Software Supports $10 Million Revenue Increase for Growing IT Firm", retrieved at <<http://www.microsoft.com/dynamics/casestudies/sl.aspx?casestudyid=4000002366>>, Jul. 8, 2008, pp. 4.

"Microsoft Dynamics™ Enabling Real-World SOA to Connect Your Business Vision with Software", retrieved at <<http://download.microsoft.com/download/1/7/5/175d4c0e-d94d-4288-8e53-4606a9197a0d/ Microsoft_Dynamics_SOA_whitepaper.doc>>, Mar. 30, 2007, pp. 22.

Tucker, Scott., "Publish Your Microsoft Dynamics SL Documents to a SharePoint Site", retrieved at <<http://www.microsoft.com/dynamics/sl/using/publishtosharepoint.mspx>>, Jan. 5, 2009, pp. 2.

\* cited by examiner

180

DISPLAY DATA RECORD FOR SELECTED ENTITY
182

DISPLAY RELATED DOCUMENTS OPTION
184

RECEIVE SELECTION FROM USER OF RELATED DOCUMENTS OPTION
186

DISPLAY UNSTRUCTURED DOCUMENTS FOR THE SELECTED ENTITY
188

TECHNIQUES FOR INTEGRATING STRUCTURED ACCOUNTING DATA WITH UNSTRUCTURED DATA

BACKGROUND

Companies or individuals often use an accounting or similar type of application for tracking financial and related data for an entity, such as for projects, customers, vendors, etc. Such accounting applications typically store entity information in a structured format, such as in one or more relational databases. By storing the data in a structured format, the data can be organized and analyzed in additional ways that are typically not available with unstructured data.

In some instances, a large amount of unstructured data also gets created for a particular entity in documents that reside on web sites, file servers, or other locations. Examples of such unstructured documents include detailed project specifications, web pages related to a project, a letter that was sent to a customer, and so on. Since the accounting applications do not handle this unstructured data, users have to separately track the unstructured data on their own so they can find it when they need to. In doing so, the user may have to switch between different types of applications to review the various data related to an entity, if the user is fortunate enough to even know where to find the data that exists outside of the accounting application.

SUMMARY

Various technologies and techniques are disclosed for integrating structured accounting data with unstructured data. From an application that manages structured accounting data related to an entity, a user selection is received to create a document container for a collaboration tool. The document container is used for storing unstructured data related to the entity. In response to the selection of a create option, a site creation service is launched for automatically creating the document container using settings previously specified by an administrator on a configuration screen of the application. Once the document container is created, unstructured data related to the entity is stored in the document container. The user can view and navigate among the structured accounting data and unstructured data without having to leave the application. Unstructured data is automatically published to the document container for the entity as users interact with the application.

In one implementation, a method for enabling a user to navigate between structured accounting data and unstructured data is described. A data record is displayed for a selected entity within an application for managing structured accounting data. A related documents option is displayed, that when selected, enables a user to view one or more unstructured documents for the selected entity that are stored in a document container of a collaboration tool that has been integrated with the application.

In another implementation, a method for automatically publishing unstructured data to a document container for an entity is described. As one or more users interact with an application that manages structured accounting data for an entity, unstructured data is automatically published to a document container that is contained in a collaboration tool that has been integrated with the application. The unstructured data is automatically published based upon one or more rules that were specified for the document container. One or more of the users can access the unstructured data in the document container from within the application.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that integrates structured accounting data with unstructured data, but the technologies and techniques also serve other purposes in addition to these. In one implementation, one or more of the techniques described herein can be implemented as features within accounting program such as MICROSOFT® Dynamics SL, MICROSOFT® Office Small Business Accounting, or from any other type of program or service that manages accounting and/or related data of one or more entities.

In one implementation, techniques are described for integrating an accounting application having structured data with unstructured data that is related to the entities being managed in the accounting application. The term "accounting application" as used herein is meant to include an application that manages financial accounting, project accounting, tasks, and/or other data for one or more entities. The term "entity" as used herein is meant to include a customer, vendor, account, project, or other company, individual, or concept whose data is being tracked. A collaboration tool with one or more document libraries is used to store unstructured data related to the entities in the accounting application.

In one implementation, the collaboration tool and/or document libraries can easily be created from the accounting application, such as by a single mouse click. Unstructured data that is created within the accounting application can be automatically or manually stored in the document container of the collaboration tool. Alternatively or additionally, users can view the unstructured data from within the accounting application without having to open various other applications.

Figure 1:
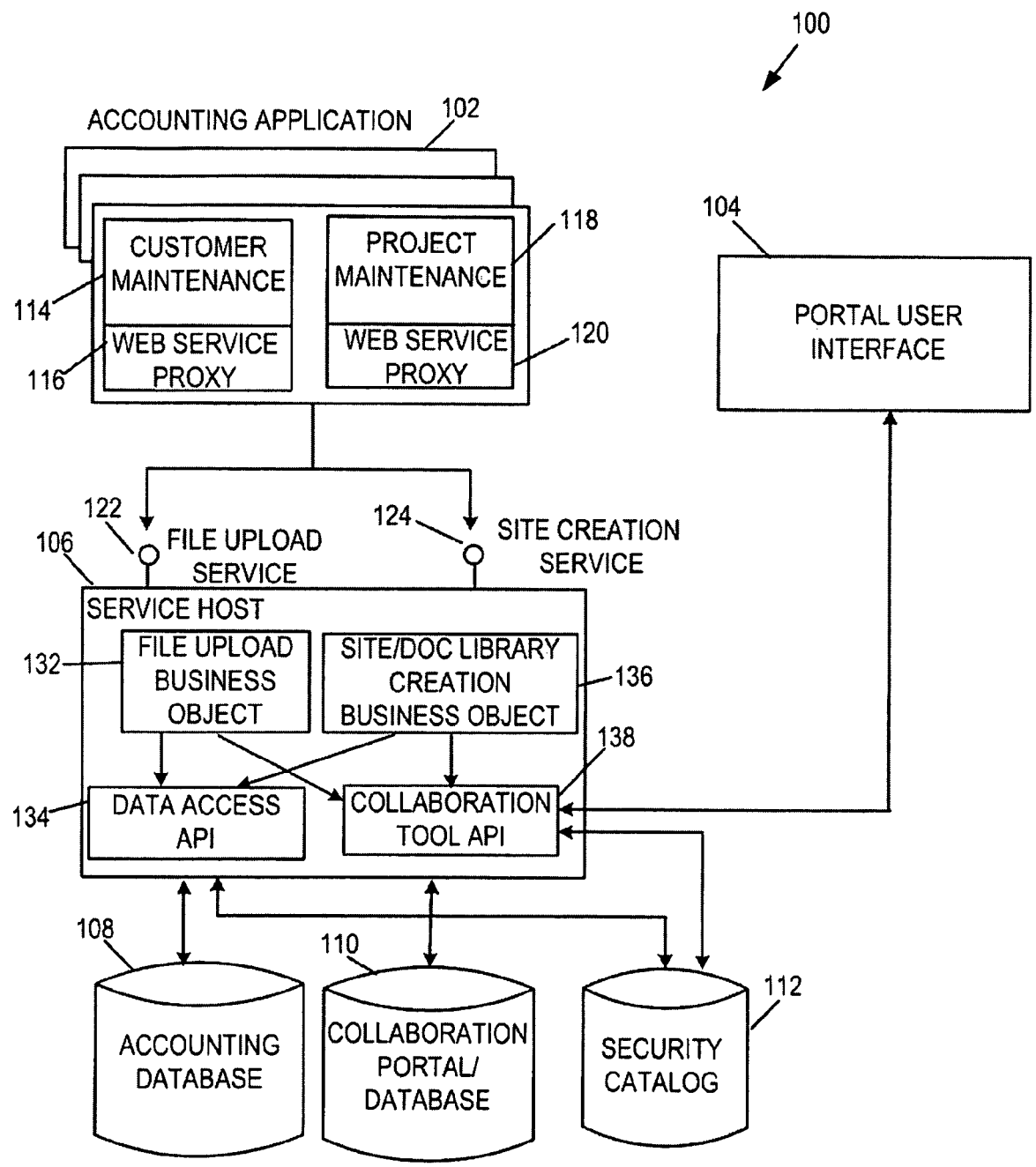
FIG. 1 is a diagrammatic view of a system for integrating an accounting application with unstructured data in a collaboration tool.

As shown in FIG. 1, a system 100 for integrating an accounting application with unstructured data in a collaboration tool is described. System 100 includes an accounting application 102, a portal layer 104, a service host 106, an accounting database 108, a collaboration tool 110, and a security catalog 112. The accounting application 102 has a customer maintenance module 114 and a project maintenance module 118. The customer maintenance module 114 is responsible for managing details about entities that are customers. The project maintenance module 118 is responsible for managing project-related data. The accounting application 102 communicates with the service host 106 whenever data needs created, managed, or viewed from the accounting database 108, collaboration tool 110, and/or security catalog 112.

Figure 2:
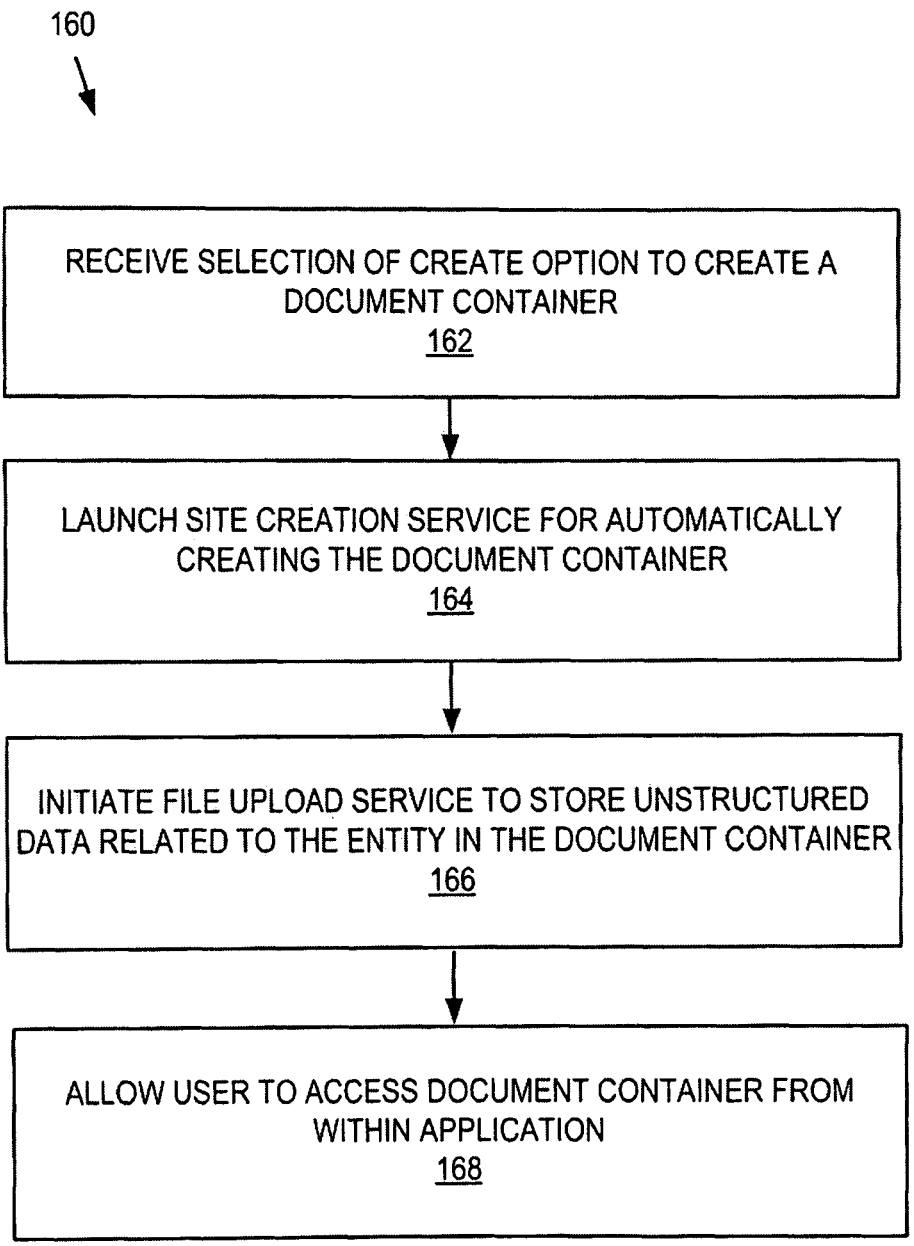
FIG. 2 is a process flow diagram for one implementation illustrating the stages involved in creating a document container in a collaboration data store from an accounting application.

As described in further detail in FIG. 2, whenever a new collaboration tool and/or document container on the collaboration tool need created, the site creation service 124 is called from accounting software 102 through web service proxy 116 or 120. The term "collaboration tool" as used herein is meant to include an application that manages a data store for storing unstructured data. A non-limiting example of a collaboration tool includes a web-based document management application such as MICROSOFT® Office Sharepoint Server. The term "document container" as used herein is meant to include a segment of a collaboration tool that has been grouped together for a specific purpose, such as storing data related to a certain entity.

The site creation service 124 is responsible for creating new collaboration tools and/or document libraries that can store unstructured data for the entities being tracked in the accounting application 102. Site creation service 124 utilizes a site creation business object 136 that interfaces with a data access API to read and write data from a database, such as collaboration tool 110. Site creation service 124 also interfaces with a collaboration tool API 138 to in order to create collaboration tools and document libraries (that are then stored as part of collaboration tool 110).

In one implementation, site creation service 124 is operable to receive security settings from the accounting application 102 and use the security settings to automatically create the proper security roles and/or permissions in the collaboration tool 110. In other words, to enable the accounting application 102 to easily integrate with the collaboration tool 110, security roles for users can be setup upon site creation (or a later time) so that interactions with the one or more document libraries of the collaboration tool 110 can be handled directly from the accounting application 102. This further facilitates the integration between the accounting application 102 and the collaboration tool 110 so users of the accounting application can view unstructured data directly from within the accounting application 102.

The file upload service 122 is responsible for uploading documents from the accounting application 102 to the collaboration tool 110, such as automatically when certain reports are generated from the accounting application 102. Upon receiving a file upload request from the accounting application 102, the file upload service 122 utilizes the file upload business object 132 to perform the upload, and uses the data access API 134 to then communicate with the collaboration tool 110 to store the uploaded data. This is described in more detail in FIG. 2.

In one implementation, a portal user interface 104 allows the collaboration portal/database 110 to be accessed from a thin client application, such as a web browser.

Turning now to FIGS. 2-7, the stages for implementing one or more implementations of system 100 are described in further detail. In some implementations, the processes of FIGS. 2-7 are at least partially implemented in the operating logic of computing device 500 (of FIG. 8).

FIG. 2 is a process flow diagram 160 that illustrates one implementation of the stages involved in creating a document container in a collaboration tool from an accounting application. The document container is operable to store unstructured data related to the entity. A selection of a create option is received from a user to create the document container for the collaboration tool (stage 162). In one implementation, the selection of the create option is received from a single mouse click of the user. In response to the selection of the create option, a site creation service is launched for automatically creating the document container using one or more settings previously specified by an administrator on a configuration screen of the application (stage 164). The configuration screen enables the administrator to specify one or more settings for integrating the application with the collaboration tool.

In one implementation, information is transmitted to the site creation service about the users who have access to data for the entity in the application so that the site creation service can create access rights for the users in the document container on the collaboration tool to enable the users to also access data for the entity in the document container.

Once the document container is created, at least some unstructured data related to the entity is stored in the document container (stage 166). In one implementation, a file upload service is initiated from the accounting application to store the unstructured data in the document container. In one implementation, the file upload service is initiated whenever one or more reports containing unstructured data are generated for the entity from the application and need stored in the document container. For example, the file upload service can be launched automatically whenever one or more reports are created (such as those that are setup for automatic publication to the document container in the configuration settings for the site). One or more users are able to access the document container from within the accounting application (stage 168), and optionally from external applications as well. In one implementation, the user is able to access the document container with a single mouse click from the accounting application.

Figure 3:
FIG. 3 is a process flow diagram for one implementation illustrating the stages involved in enabling a user to navigate among structured accounting data and unstructured data in a document container.
Figure 3:
Figure 3:
Figure 3:

FIG. 3 is a process flow diagram 180 that illustrates one implementation of the stages involved in enabling a user to navigate among structured accounting data and unstructured data in a document container from within an accounting application. A data record is displayed for a selected entity in the accounting application (stage 182). A related documents option is displayed that enables a user to view one or more unstructured documents for the selected entity that are stored in a document container (stage 184). In one implementation, the user can access the unstructured documents for the selected entity with a single mouse click of the related documents option. The document container is part of a collaboration tool that has been integrated with the application.

Upon receiving a selection from the user to select the related documents option (stage 186), the one or more unstructured documents are displayed (stage 188). In one implementation, the unstructured documents are displayed within a screen of the accounting application. In another implementation, the unstructured documents are displayed by launching a screen associated with the collaboration tool. In such a scenario, the accounting application causes a separate screen from the collaboration tool to be displayed. Login credentials of the user can be provided to the collaboration tool so that the user does not have to separately log in to the collaboration tool before the screen with the unstructured documents for the selected entity is displayed.

In one implementation, a user can initially create the document container from within the accounting application, such as with a single click of a create option. Then, as users interact with the application, the unstructured documents are stored in the document container for the selected entity and enabled for display as discussed herein.

Figure 4:
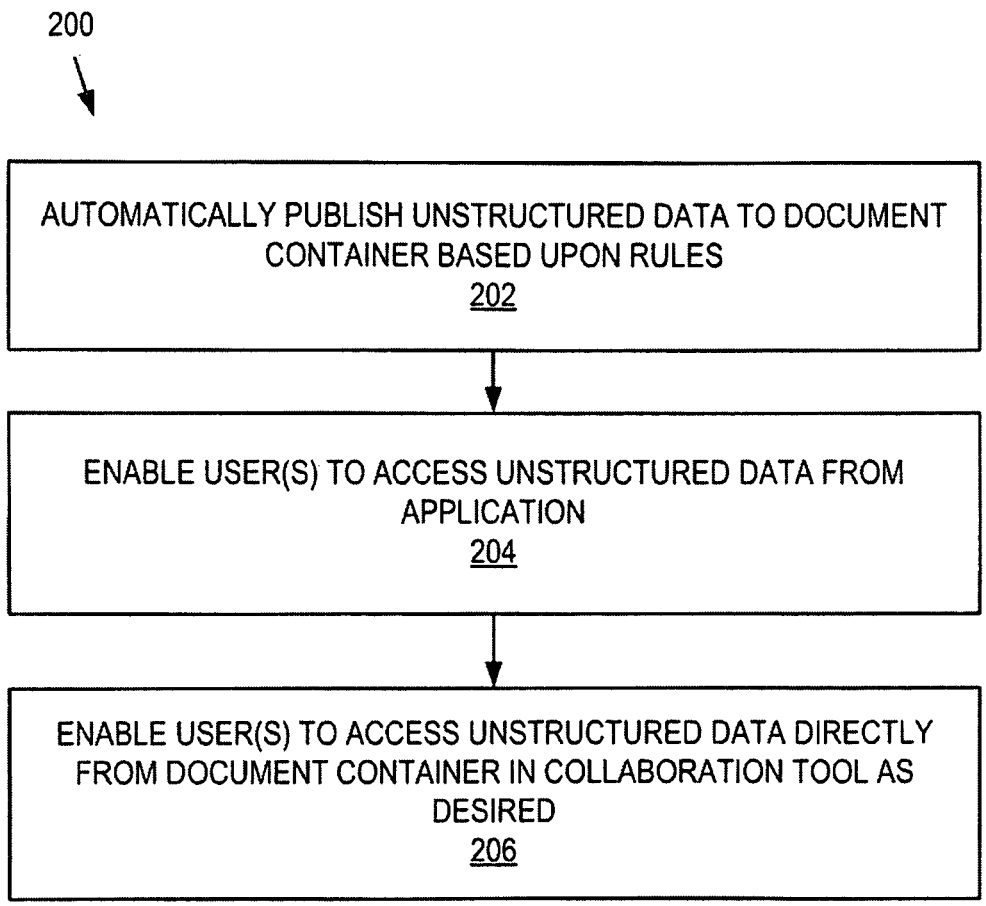
FIG. 4 is a process flow diagram for one implementation illustrating the stages involved in automatically publishing unstructured data to a document container for an entity.
Figure 6:
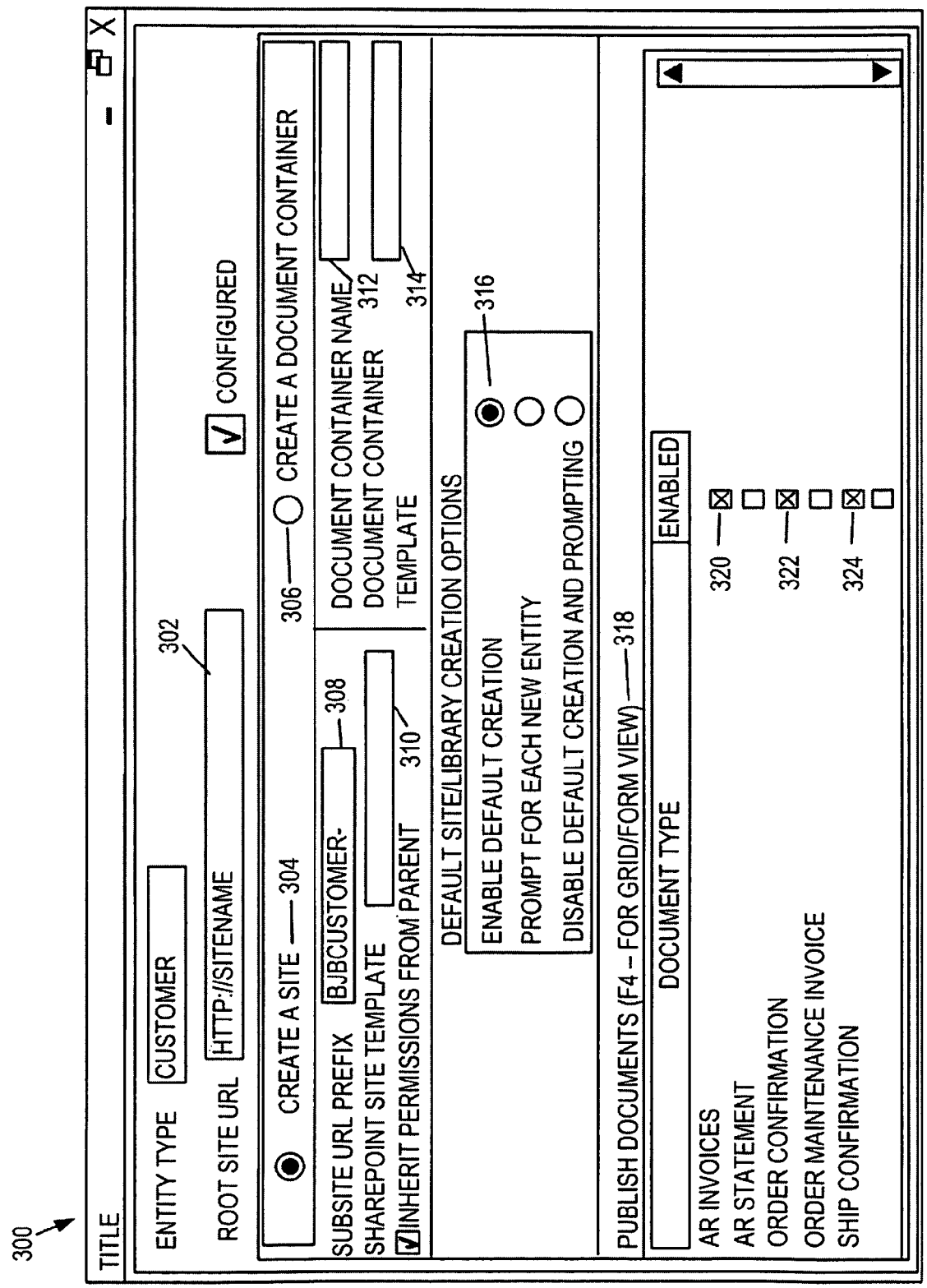
FIG. 6 is a simulated screen for one implementation that illustrates a configuration screen for enabling an administrator to specify one or more settings for a collaboration tool that contains one or more document libraries that are integrated with an accounting application.

FIG. 4 is a process flow diagram 200 that illustrates one implementation of the stages involved in automatically publishing unstructured data to a document container for an entity. As one or more users interact with an application that manages structured accounting data for an entity, unstructured data is automatically published to a document container that is contained in a collaboration tool that has been integrated with the application (stage 202). For example, rules can be defined to specify one or more types of reports that should be published automatically when reports of the specified type are created in the application. A few non-limiting examples of the types of reports that can be published automatically include a customer invoice, order confirmation, shipment confirmation, accounts receivable statement, order maintenance invoice, etc. An example configuration screen for specifying the automatic publication options is illustrated in FIG. 6.

The unstructured data is automatically published based upon one or more rules that were specified for the document container (stage 202). One or more of the users are provided with access the unstructured data in the document container from within the application (stage 204). One or more of the users can also be provided with access to the unstructured data in the document container from the collaboration tool or another application (stage 206). In other words, while the user(s) can certainly manage the unstructured data from within the accounting application, in some implementations, the user can also add, edit, view, and/or delete unstructured data in the document container from other applications, such as an interface associated with the document container itself or a separate application.

Figure 5:
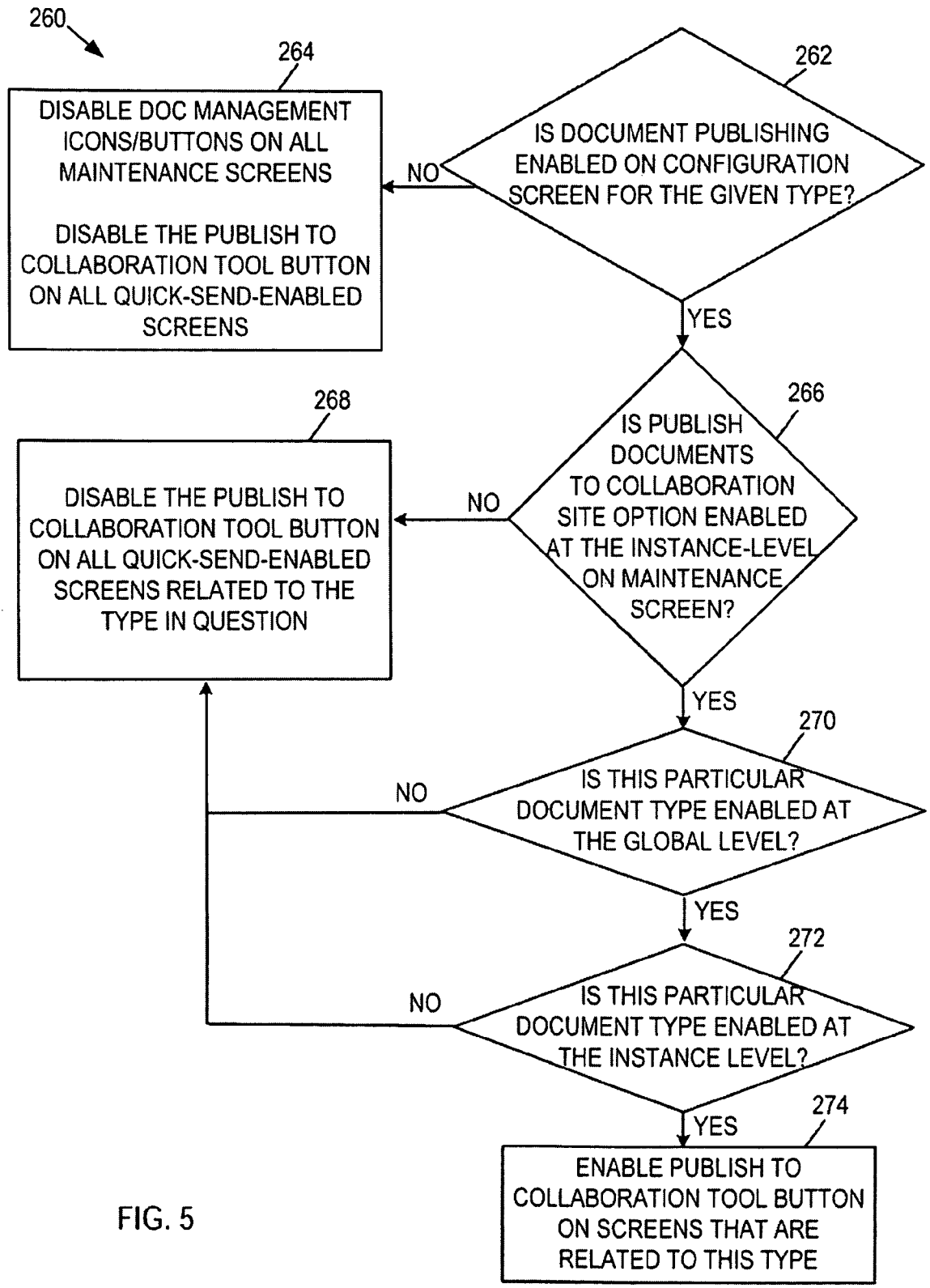
FIG. 5 is a process flow diagram for one implementation illustrating the stages involved in enabling and disabling publishing options for the document container based upon configuration settings.

FIG. 5 is a process flow diagram 260 that illustrates one implementation of the stages involved in enabling and disabling publishing options for the document container within an accounting application based upon configuration settings. When document publishing is not enabled on a configuration screen for the given entity type (decision point 262), then the document management icons and/or buttons are disabled on all maintenance screens for the entity and the publish to collaboration tool button is disabled on all quick-send enabled screens (stage 264). In other words, if document publishing is not even enabled for this type of entity, then the options for publishing new documents to the document container and/or managing the documents are not enabled and/or displayed since the operation is not authorized.

When document publishing is enabled on a configuration screen for the given entity type (decision point 262), but the publish document to the collaboration tool option is not enabled at the instance-level on the maintenance screen (decision point 266), then the publish to collaboration tool button/option is disabled on all quick-send-enabled screens related to the type in question (stage 268). When the document publishing is enabled on a configuration screen for the given entity type (decision point 262), when the publish document to the collaboration tool option is enabled at the instance-level on the maintenance screen (decision point 266), when the particular document type is enabled at the global level (decision point 270), and when the particular document type is enabled at the instance level (decision point 272), then the publish to collaboration tool button/option is enabled on screens that are related to this type (stage 274).

Figure 7:
FIG. 7 is a simulated screen for one implementation that illustrates options for creating and viewing a document container to store unstructured data for an entity from an accounting application.

Turning now to FIGS. 6-7, simulated screens are shown to illustrate a user interface that shows techniques for creating and managing document libraries from accounting application 102. These screens can be displayed to users on output device(s) 511 (of FIG. 8). Furthermore, these screens can receive input from users from input device(s) 512 (of FIG. 8).

FIG. 6 shows a simulated screen 300 of one implementation that illustrates a configuration screen for enabling an administrator to specify one or more settings for a collaboration tool that contains one or more document libraries that are integrated with an accounting application. The configuration screen that is shown enables an administrator or other authorized user to select a create site option 304 to create a new collaboration tool, when one does not already exist. An option for creating a document container 306 for an existing collaboration tool is also shown. Integration details 302 can be specified to allow the accounting application to communicate with the collaboration tool. In this example, the integration details 302 include the root site URL where the collaboration tool is located. If a document container is being created, then a sub-site URL 308 for where the document container should be stored can be specified. Options can be specified to create the new site or document container from using an existing site as a template 310. When a document container is being created, a document container name 312 can be specified, and optionally a document container template 314 to use when creating the document container.

Screen 300 also contains various options for specifying how the collaboration tool and/or document container should function from the accounting application. For example, default site and library creation options 316 can be set to specify whether or not end users will be able to create new sites and/or document libraries. Options can also be specified to indicate which types of documents 318 should be published automatically from the accounting application to the document container on the collaboration tool. In this example, accounts receivable invoices 320, order confirmations 322, and shipment confirmations 324 have been enabled for automatic publication to the document container. With these options enabled, any time a user creates one of these documents from the accounting application, then a copy of that document gets stored in the associated document container so that it can be retrieved and viewed later.

FIG. 7 shows a simulated screen 400 of one implementation that illustrates options for enabling users to create and view a document container for storing unstructured data for an entity from an accounting application. In the example shown, a create option 402 is displayed to enable a user to create a new document container, such as for the customer or other entity that is being displayed on the screen. Once a document container has been created for the entity, a view option 404 is displayed to enable the user to view the document container and any of the unstructured documents that it contains. The user is able to work with the accounting and related data, such as terms and pricing 406, credit details 408, and customer balance 410, and easily switch to and view the related unstructured documents by selecting the view option 404. This can be useful, for example, if prior customer invoices or other documents were stored in the document container and need to be reviewed or otherwise accessed from within the accounting application.

Figure 8:
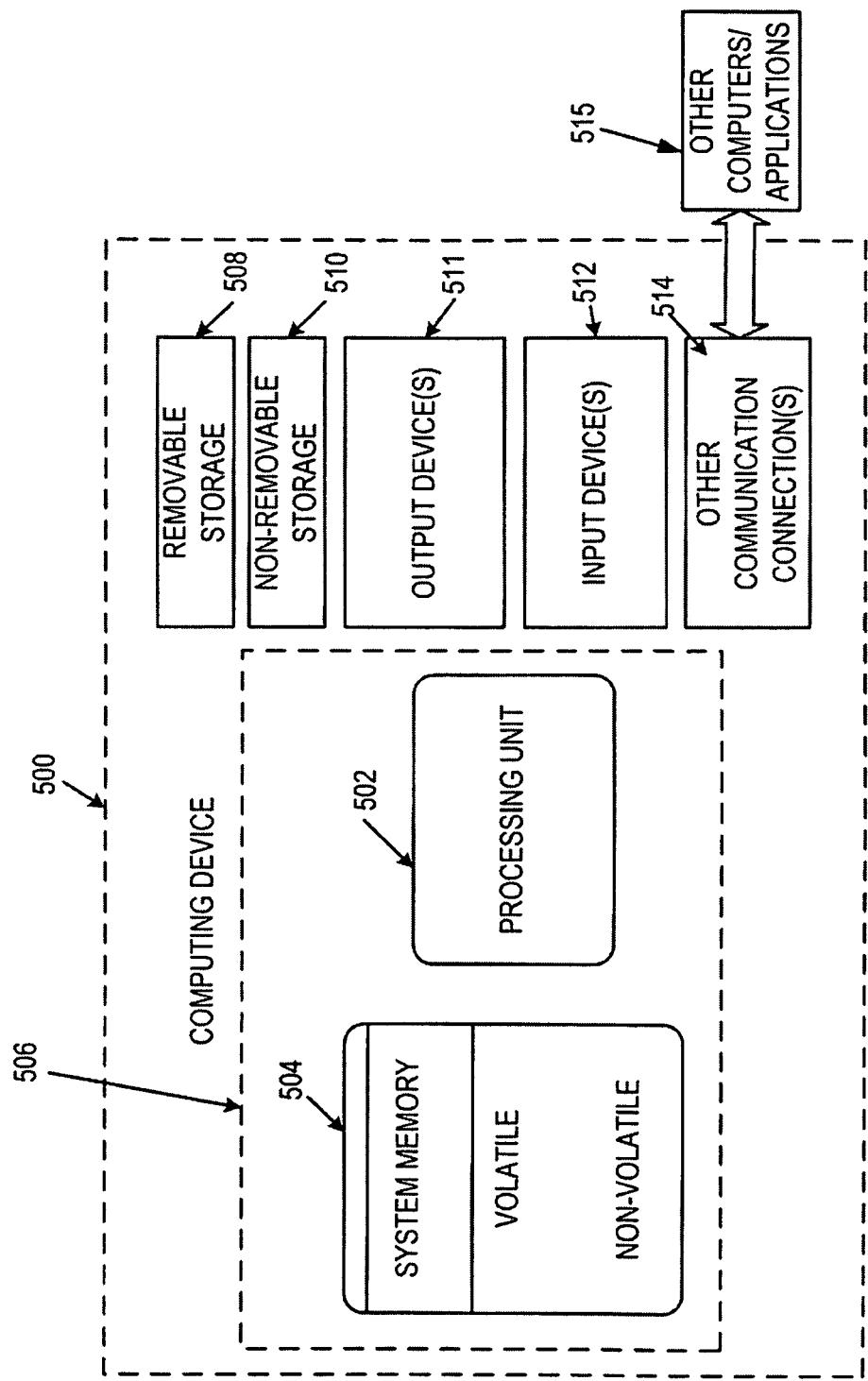
FIG. 8 is a diagrammatic view of a computer system of one implementation.

As shown in FIG. 8, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 8 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 8 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here. In one implementation, computing device 500 includes one or more parts of accounting application 102, service host 106, and/or portal user interface 104.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable memory device having computer-executable instructions for causing a computer to perform steps comprising:
    from an application operable to manage structured accounting data related to an entity, receiving a selection of a create option to create a document container for a collaboration tool with one or more document libraries, the document container being operable to store unstructured data related to the entity, the entity including at least one of a customer, vendor, account, or project;
    in response to receiving an integration detail including a location of the collaboration tool and a security setting for a user associated with the application, using the integration detail to authenticate the application to the collaboration tool;
    in response to the selection of the create option, launching a site creation service for automatically creating the document container from a document container template including default site options and library creation options using one or more settings previously specified by an administrator on a configuration screen of the application, wherein the site creation service is called through a web service proxy, and is configured to create new collaboration tools and document libraries to store unstructured data being tracked by the application by utilizing a site creation business object that interfaces with a data access application programming interface (API) to read and write data from a database;
    enabling the administrator to specify settings for the collaboration tool including a root site uniform resource locator (URL) where the collaboration tool is located and a sub-site URL where the document container is stored;
    once the document container is created, storing at least some unstructured data related to the entity in the document container; and
    in response to detecting a disabled publish configuration on the configuration screen, disabling management of the entity by the collaboration tool.

2. The computer-readable memory device of claim 1, further having computer-executable instructions for causing a computer to perform steps comprising:
    receiving the selection of the create option from a single mouse click.

3. The computer-readable memory device of claim 1, further having computer-executable instructions for causing a computer to perform steps comprising:
    initiating a file upload service whenever one or more reports containing unstructured data are generated for the entity from the application and need stored in the document container.

4. The computer-readable memory device of claim 3, further having computer-executable instructions for causing a computer to perform steps comprising:
    initiating the file upload service automatically when the one or more reports are created.

5. The computer-readable memory device of claim 1, further having computer-executable instructions for causing a computer to perform steps comprising:
    enabling the user to access the document container containing the unstructured data for the entity from within the application.

6. The computer-readable memory device of claim 5, further having computer-executable instructions for causing a computer to perform steps comprising:
    enabling the user to access the document container with a single mouse click.

7. The computer-readable memory device of claim 1, wherein the configuration screen is operable to enable the administrator to specify one or more settings for integrating the application with the collaboration tool.

8. The computer-readable memory device of claim 1, further having computer-executable instructions for causing a computer to perform steps comprising:

transmitting information to the site creation service about the user who has access to data for the entity in the application so that the site creation service can create access rights for the user in the document container on the collaboration tool to enable the user to also access data for the entity in the document container.

9. A method for enabling a user to navigate between structured accounting data and unstructured data comprising the steps of:

from within an application for managing structured accounting data, displaying a data record for a selected entity;

in response to receiving an integration detail including a location of a collaboration tool and a security setting for the user associated with the application, use the integration detail to authenticate the application to the collaboration tool;

displaying a related documents option that enables the user to view one or more unstructured documents for the selected entity that are stored in a document container of the collaboration tool that has been integrated with the application;

enabling the user to specify settings for the collaboration tool including a root site uniform resource locator (URL) for where the collaboration tool is located, a sub-site URL for where the document container is stored, and a name for the document container;

upon receiving a selection from the user of the related documents option, displaying the one or more unstructured documents;

prompting the collaboration tool to launch an associated screen to display the one or more unstructured documents;

providing an interface associated with the document container to manage the unstructured documents by at least one from a set of: adding, editing, viewing, and deleting the unstructured documents from another application; and providing a view option for the document container to display the structured accounting data including at least one from a set of: pricing, credit details, and customer balance.

10. The method of claim 9, wherein the unstructured documents are displayed within a screen of the application.

11. The method of claim 9, wherein the unstructured documents are displayed by launching a screen associated with the collaboration tool.

12. The method of claim 11, wherein login credentials of the user are provided to the collaboration tool so that the user does not have to separately log in to the collaboration tool before the screen with the unstructured documents for the selected entity is displayed.

13. The method of claim 9, wherein the user can access the unstructured documents for the selected entity with a single mouse click of the related documents option.

14. The method of claim 9, wherein prior to displaying the related documents option, enabling the user to create the document container with a single click of a create option.

15. The method of claim 9, wherein upon selection of a create option, the document container is then created, as users interact with the application, the unstructured documents are stored in the document container for the selected entity.

16. A method for automatically publishing unstructured data to a document container for an entity comprising the steps of:

as one or more users interact with an application that manages structured accounting data for an entity, automatically publishing unstructured data including accounts receivable invoices, order confirmations, and shipment confirmations to a document container that is contained in a collaboration tool that has been integrated with the application, the unstructured data being automatically published based upon one or more rules that were specified for the document container;

using an integration detail including at least one of: a location of the collaboration tool and a security setting for a user associated with the application, to authenticate the application to the collaboration tool, wherein the security setting is used to automatically create security roles and permissions in the collaboration tool upon site creation to enable interactions with the document container of the collaboration tool from within the application;

enabling the one or more users to access the unstructured data in the document container from within the application;

disabling management of the entity by the collaboration tool in response to detecting a disabled publish configuration on a configuration screen of the application;

providing a view option for the document container to display the structured accounting data including pricing, credit details, and customer balance;

in response to receiving a selection from the one or more users selecting a related documents option, prompting the collaboration tool to launch an associated screen to display the unstructured data; and providing an interface associated with the document container to manage the unstructured data by adding, editing, viewing, and deleting the unstructured data from another application.

17. The method of claim 16, wherein at least one of the rules specifies one or more types of reports that should be published automatically when reports of the specified type are created in the application.

18. The method of claim 16, wherein at least some of the unstructured data is a customer invoice.

19. The method of claim 16, wherein at least some of the unstructured data is an order confirmation.

20. The method of claim 16, wherein at least some of the unstructured data is a shipment confirmation.

* * * * *